United States Patent
Fuller et al.

(10) Patent No.: US 9,489,336 B2
(45) Date of Patent: Nov. 8, 2016

(54) METHOD AND SYSTEM FOR RECORD ACCESS IN A DISTRIBUTED SYSTEM

(71) Applicant: Oracle International Corporation, Redwood City, CA (US)

(72) Inventors: Benjamin J. Fuller, Concord, MA (US); Robert J. Hueston, Stoneham, MA (US); Jorge E. Lach, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 319 days.

(21) Appl. No.: 13/942,240

(22) Filed: Jul. 15, 2013

(65) Prior Publication Data

US 2015/0019672 A1    Jan. 15, 2015

(51) Int. Cl.
*G06F 15/167* (2006.01)

(52) U.S. Cl.
CPC .................. *G06F 15/167* (2013.01)

(58) Field of Classification Search
CPC ..................................................... G06F 15/167
USPC ....... 707/706, 713, 722, 736, 758, 781, 782, 707/783, 999.009, 999.01; 709/225, 229
See application file for complete search history.

(56) References Cited

U.S. PATENT DOCUMENTS

| | | | |
|---|---|---|---|
| 6,792,458 B1 * | 9/2004 | Muret et al. | 709/224 |
| 8,086,585 B1 * | 12/2011 | Brashers et al. | 707/705 |
| 2008/0071842 A1 * | 3/2008 | Tokuda et al. | 707/202 |
| 2013/0227139 A1 * | 8/2013 | Suffling | 709/225 |

* cited by examiner

*Primary Examiner* — Syling Yen
(74) *Attorney, Agent, or Firm* — Osha Liang LLP

(57) ABSTRACT

A method for record access in a distributed system includes receiving a request for a record, wherein the request comprises a transmitted key and a record identifier, extracting a location identifier and a transmitted pseudorandom portion from the transmitted key, obtaining a stored pseudorandom portion from a location in a key memory specified by the location identifier, and providing access to the record identified by the record identifier when the transmitted pseudorandom portion matches the stored pseudorandom portion.

17 Claims, 9 Drawing Sheets

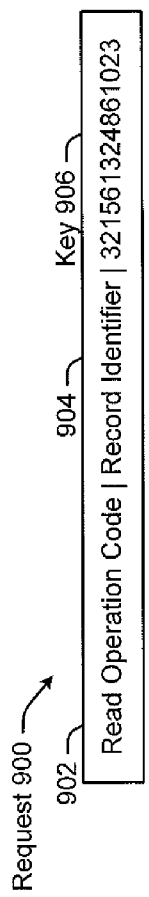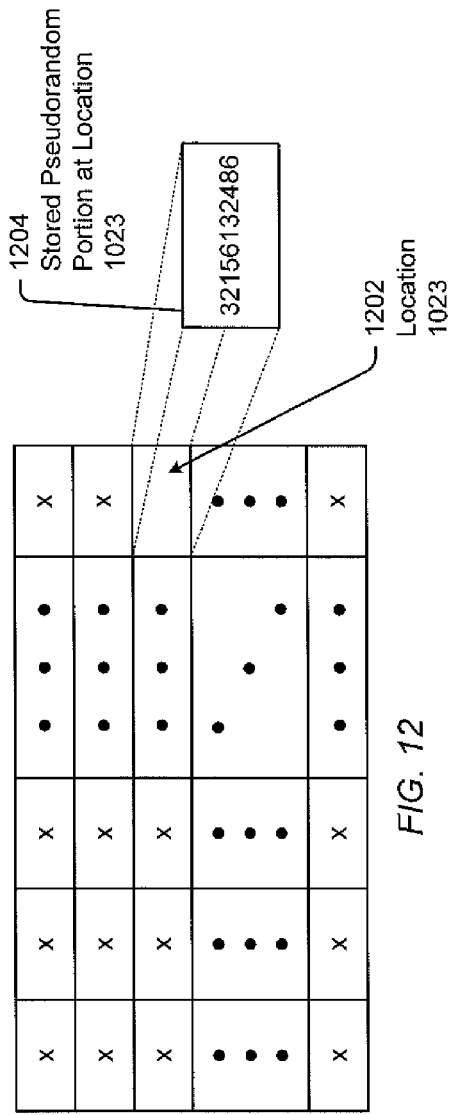

1302 — Scoreboards at Time t0

FIG. 13 (1304)

| | WB7 | WB6 | WB5 | WB4 | WB3 | WB2 | WB1 | WB0 | Summary |
|---|---|---|---|---|---|---|---|---|---|
| Scoreboard0 | 0 | 0 | 0 | 1 | 0 | 1 | 0 | 1 | 1 |
| Scoreboard1 | x | x | x | x | x | x | x | x | x |
| Scoreboard2 | x | x | x | x | x | x | x | x | x |
| Scoreboard3 | x | x | x | x | x | x | x | x | x |

1402 — Scoreboards at Time t1

FIG. 14 (1406)

| | WB7 | WB6 | WB5 | WB4 | WB3 | WB2 | WB1 | WB0 | Summary |
|---|---|---|---|---|---|---|---|---|---|
| Scoreboard0 | 0 | 0 | 0 | 1 | 0 | 0 | 0 | 1 | 1 |
| Scoreboard1 | x | x | x | x | x | x | x | x | x |
| Scoreboard2 | x | x | x | x | x | x | x | x | x |
| Scoreboard3 | x | x | x | x | x | x | x | x | x |

1502 — Scoreboards at Time t2

FIG. 15

| | WB7 | WB6 | WB5 | WB4 | WB3 | WB2 | WB1 | WB0 | Summary |
|---|---|---|---|---|---|---|---|---|---|
| Scoreboard0 | 0 | 0 | 0 | 1 | 0 | 0 | 0 | 1 | 1 |
| Scoreboard1 | 1 | 0 | 0 | 1 | 0 | 0 | 0 | 1 | 1 |
| Scoreboard2 | 1 | 1 | 0 | 1 | 0 | 1 | 0 | 1 | 1 |
| Scoreboard3 | 1 | 1 | 1 | 1 | 0 | 0 | 0 | 1 | 1 |

FIG. 16 — 1602 Scoreboards at Time t3 / 1604

| | WB7 | WB6 | WB5 | WB4 | WB3 | WB2 | WB1 | WB0 | Summary |
|---|---|---|---|---|---|---|---|---|---|
| Scoreboard0 | 0 | 0 | 0 | 1 | 0 | 0 | 0 | 0 | 1 |
| Scoreboard1 | 1 | 0 | 0 | 1 | 0 | 0 | 0 | 0 | 1 |
| Scoreboard2 | 1 | 1 | 0 | 1 | 0 | 0 | 0 | 0 | 1 |
| Scoreboard3 | 1 | 1 | 1 | 0 | 0 | 1 | 0 | 0 | 1 |

FIG. 17 — 1702 Scoreboards at Time t4 / 1704

| | WB7 | WB6 | WB5 | WB4 | WB3 | WB2 | WB1 | WB0 | Summary |
|---|---|---|---|---|---|---|---|---|---|
| Scoreboard0 | 0 | 0 | 0 | 1 | 0 | 0 | 0 | 0 | 1 |
| Scoreboard1 | 1 | 0 | 0 | 1 | 0 | 0 | 0 | 0 | 1 |
| Scoreboard2 | 1 | 0 | 0 | 1 | 0 | 0 | 0 | 0 | 1 |
| Scoreboard3 | 1 | 0 | 1 | 0 | 0 | 1 | 0 | 0 | 1 |

FIG. 18 — 1802 Scoreboards at Time t5 / 1808

| | WB7 | WB6 | WB5 | WB4 | WB3 | WB2 | WB1 | WB0 | Summary |
|---|---|---|---|---|---|---|---|---|---|
| Scoreboard0 | 0 | 0 | 0 | 0 | 0 | 0 | 0 | 0 | 0 |
| Scoreboard1 | 1 | 0 | 0 | 0 | 0 | 0 | 0 | 0 | 1 |
| Scoreboard2 | 1 | 0 | 0 | 0 | 0 | 0 | 0 | 0 | 1 |
| Scoreboard3 | 1 | 0 | 1 | 0 | 0 | 1 | 0 | 0 | 1 |

METHOD AND SYSTEM FOR RECORD ACCESS IN A DISTRIBUTED SYSTEM

BACKGROUND

A typical distributed computer system includes multiple interconnected nodes. Each node in the distributed computer system may include one or more processors and memory. The nodes may execute software in parallel to provide functionality to a client. As another example, the client may be a node of the distributed computer system and may request services or data from another node in the distributed computer system.

SUMMARY

In general, in one aspect, embodiments relate to a method for record access in a distributed system. The method includes receiving a request for a record, wherein the request comprises a transmitted key and a record identifier, extracting a location identifier and a transmitted pseudorandom portion from the transmitted key, obtaining a stored pseudorandom portion from a location in a key memory specified by the location identifier, and providing access to the record identified by the record identifier when the transmitted pseudorandom portion matches the stored pseudorandom portion.

In general, in one aspect, embodiments relate to a system for record access in a distributed system that includes an authentication module. The authentication module includes key memory and a hardware gatekeeper. The key memory is configured to store a plurality of pseudorandom portions of multiple keys. The hardware gatekeeper is configured to receive a request for a record, wherein the request comprises a transmitted key and a record identifier, extract a first location identifier and a transmitted pseudorandom portion from the transmitted key, obtain a stored pseudorandom portion of the plurality of pseudorandom portions from a first location in the key memory specified by the first location identifier, and provide access to the record identified by the record identifier when the transmitted pseudorandom portion matches the stored pseudorandom portion.

In general, in one aspect, embodiments relate to a distributed system for record access. The distributed computer system includes a requester node and a home node. The requester node is configured to transmit a request for a record, wherein the request comprises a transmitted key and a record identifier. The home node includes an authentication module including key memory and a hardware gatekeeper. The key memory is configured to store multiple pseudorandom portions of multiple keys. The hardware gatekeeper is configured to receive the request for the record, extract a first location identifier and a transmitted pseudorandom portion from the transmitted key, obtain a stored pseudorandom portion of the plurality of pseudorandom portions from a first location in the key memory specified by the first location identifier, and provide access to a record identified by the record identifier when the transmitted pseudorandom portion matches the stored pseudorandom portion.

Other aspects of the invention will be apparent from the following description and the appended claims.

BRIEF DESCRIPTION OF DRAWINGS

FIGS. 9-18 show examples in accordance with one or more embodiments of the invention.

DETAILED DESCRIPTION

Figure 1:
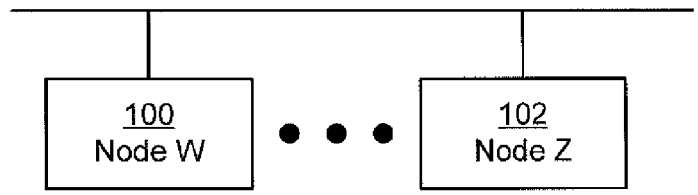
FIGS. 1-4 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for record access in a distributed system. In particular, the key includes at least a location identifier and a pseudorandom portion. The location identifier indicates the location where the key is stored. Thus, when a requesting node issues a request using a key, the location identifier may be extracted from the key and used to identify the location where the pseudorandom portion is stored. If the transmitted pseudorandom portion in the transmitted key matches the stored pseudorandom portion in the specified location, then the requesting node is provided access.

Further, one or more embodiments of the invention include functionality to perform checkpoint operations for ensuring modified records are written back from write buffers to a home node of the record. In one or more embodiments of the invention, at the start of the checkpoint operation, a scoreboard that includes an entry for each write buffer is initialized. With each write from a write buffer to the home node, the scoreboard is updated. The writes may be in any order from the write buffers. When the scoreboard shows that all entries are written back, the checkpoint is completed in accordance with one or more embodiments of the invention.

FIG. 1 shows a schematic diagram of a system in accordance with one or more embodiments of the invention. Specifically, FIG. 1 shows a schematic diagram of a distributed system in accordance with one or more embodiments of the invention. As shown in FIG. 1, the system includes multiple nodes (e.g., node w (100), node z (102)). Each node may correspond to a computing system, such as a mobile device (e.g., laptop computer, smart phone, personal digital assistant, tablet computer, or other mobile device), desktop computer, server, blade in a server chassis, or any other type of computing device or devices that includes at least the minimum processing power, memory, and input and output device(s) to perform one or more embodiments of the invention.

Nodes (e.g., node w (100), node z (102)) may be connected to a network (not shown) (e.g., a local area network (LAN), a wide area network (WAN) such as the Internet, mobile network, or any other type of network) via a network interface connection (not shown). Specifically, the nodes may be connected to each other and/or to other computing systems via a network. Alternatively or additionally, nodes may be directly connected to each other via a backplane (not shown) or other wired or wireless connection. Further, nodes may share memory and/or other resources. For example, the nodes may correspond to storage servers for storing a distributed database.

Figure 2:
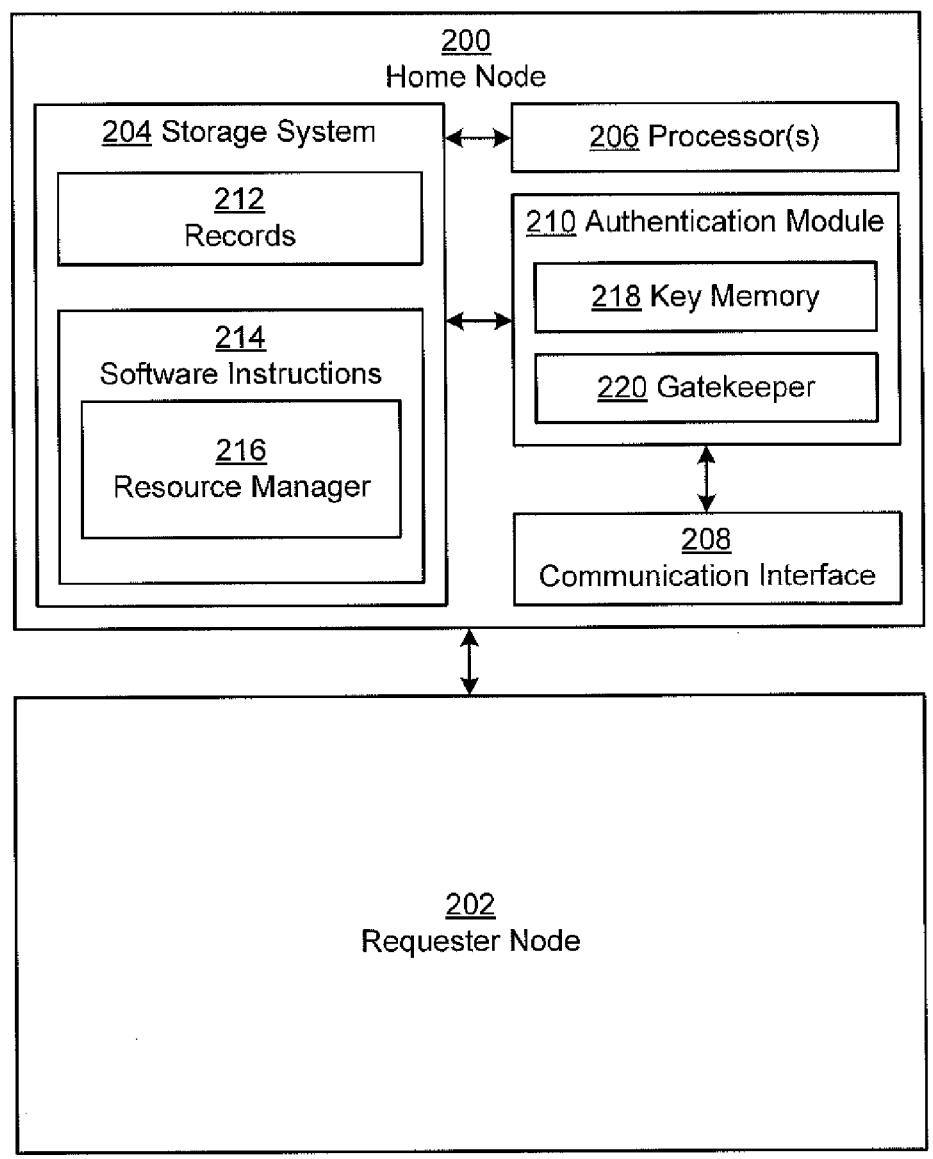

Turning to FIG. 2, FIG. 2 shows a more detailed diagram of the system in accordance with one or more embodiments of the invention. As shown in FIG. 2, a node (e.g., node w (100), node z (102) in FIG. 1) may correspond to a home node (200) or a requester node (202) for a particular request. A home node (200) is a node that receives the request. A requester node (202) is a node that transmits the request. Thus, for a different request, the node shown in FIG. 2 as the home node (200) may be a requester node and the node shown in FIG. 2 as the requester node (202) may be a home node (200). Thus, the home node (200) may include the functionality and components described below and in FIG. 3 for a requester node and the requester node (202) may include the components and functionality described below for a home node (200).

Continuing with FIG. 2, as shown in FIG. 2, the home node (200) may include a storage system (204), processor(s) (206), a communication interface (208), and an authentication module (210). Each of these components is described below.

The storage system (204) corresponds to any type of storage unit and/or device for storing data. For example, the storage system (204) may include associated memory (e.g., random access memory (RAM), cache memory, flash memory, etc.) and/or one or more storage device(s) (e.g., a hard disk, an optical drive such as a compact disk (CD) drive or digital versatile disk (DVD) drive, a flash memory stick, etc.).

The storage system (204) includes functionality to store records (212) and software instructions (214) in accordance with one or more embodiments of the invention. As used in this application, a record (212) refers to any grouping of data of any size. For example, a record may be a memory block, a database record, or any other collection of data. Each record may have a corresponding record identifier. The record identifier uniquely identifies the record in accordance with one or more embodiments of the invention. For example, the record identifier may correspond to a physical or virtual memory address, a unique identifier of a database record, or another identifier.

Software instructions (214) correspond to instructions for execution by the processor(s) (206). In one or more embodiments of the invention, the software instructions (214) include a resource manager (216). The resource manager (216) includes functionality to manage access to records and keys for authentication. For example, the resource manager (216) may include functionality to generate new keys, associate keys with access rights, manage failed access requests, and perform other actions.

Continuing with the home node (200), the storage system (204) is connected to processor(s) (206) (i.e., computer processor(s)). The processor(s) (206) may be an integrated circuit for processing the software instructions (214). For example, the processor(s) (206) may be one or more cores, or micro-cores of a processor.

In one or more embodiments of the invention, the communication interface (208) corresponds to a hardware interface device for connecting to a communication channel (e.g., network, backplane, or other connection). For example, the communication interface (208) may correspond to a network interface card, a fiber optic interface device, or any other hardware interface device.

The communication interface (208) is connected to an authentication module (210) in accordance with one or more embodiments of the invention. In one or more embodiments of the invention, the authentication module (210) corresponds to a hardware device for authenticating requests for records (212) in the storage system (204). For example, the authentication module (210) may be an application specific integrated circuit (ASIC). In one or more embodiments of the invention, the requests are remote direct memory access (RDMA) requests (e.g., RDMA read request and/or RDMA write request) from the requester node (202). Specifically, once authenticated, the authentication module (210) includes functionality to arrange RDMA between the storage system (204) and the requester node (202) bypassing the processors (206).

In one or more embodiments of the invention, the authentication module (210) includes key memory (218) and a gatekeeper (220). The key memory (218) is a hardware module that stores keys. In one or more embodiments of the invention, the key memory (218) includes functionality to receive a location identifier and respond with the content (e.g., all or a portion of the keys) stored in the location specified by the location identifier. In one or more embodiments of the invention, the key memory (218) is not content addressable memory (CAM) that receives a request for a location of content, where the location in the memory stores the content and the request includes the content, and responds with the location. In such embodiments, the location identifier is not the same as the content of the location in the key memory (218).

In one or more embodiments of the invention, the key corresponds to a sequence of bits for authenticating the requesting node (202) to access a record (212). The key includes a location identifier and a pseudorandom portion. The location identifier is a unique identifier of a location in the key memory (218). Specifically, the location identifier specifies the portion of the key memory (218) that stores the pseudorandom portion. The pseudorandom portion corresponds to a subsequence of bits that are random or at least appear random. For example, pseudorandom portion may correspond to bits that are capable of being reproduced with the same inputs and operations but appears random. The apparent randomness may be with respect to someone who knows or does not know the inputs or operations.

In one or more embodiments of the invention, the key memory may further include auxiliary data (not shown). The auxiliary data corresponds to additional data that may be included for the key. For example, auxiliary data may include a description of a resource that is authorized for access using the key, the type of access that is granted (e.g., access rights, read, write, modify, delete, create, etc.), key life identifier, a requester process identity, a requester node identity, and other data. The key life identifier may be an identifier of a time in which the key is valid. The requester process identity may include an identifier of a process on the requester node that is requesting access. In particular, in one or more embodiments of the invention, many processes may execute on a requester node may each have different access rights, and, therefore, may each have an individual and unique key. In one or more embodiments of the invention, a requester node identity may be the identity of the hardware node executing the requester process. In one or more embodiments of the invention, the resource includes the record (212). For example, the description of the resource may correspond to one or more record identifiers, an identifier of a storage device in the storage system (204), memory address range, and/or other identifying information.

Continuing with FIG. 2, the key memory (218) is operatively connected to the gatekeeper (220). In one or more embodiments of the invention, the gatekeeper (220) may correspond to hardware and/or firmware that executes in the authentication module (210). The gatekeeper (220) includes functionality to receive a request for a record (212) that includes a key from the requesting node (202), determine whether the requesting node (202) is authorized based on the key, and provide access to the resource when the requesting node (202) is authorized.

Figure 3:
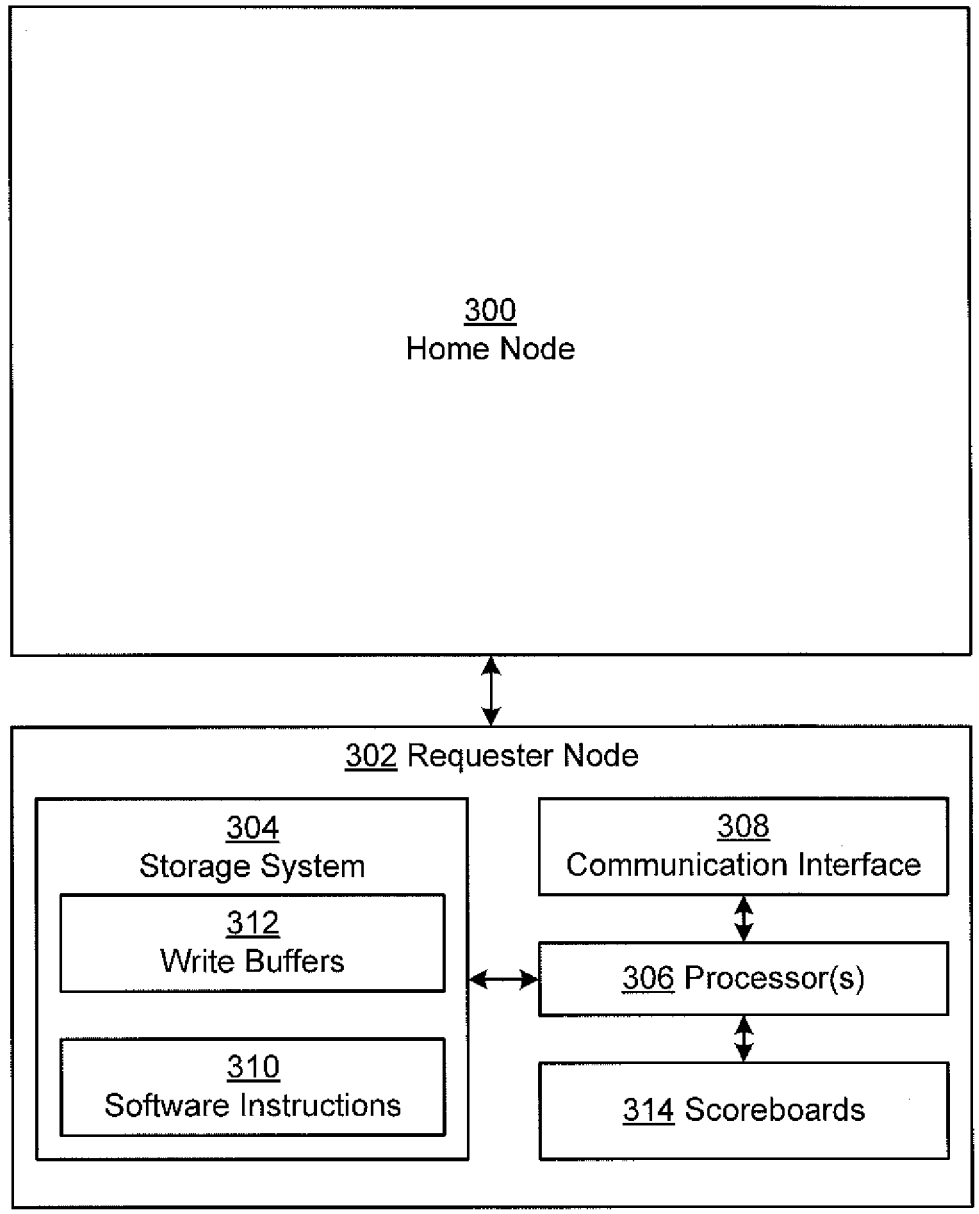

FIG. 3 shows a schematic diagram of the system with the requester node (302) shown in more detail. The home node (300) and requester node (302) in FIG. 3 may be the same or similar to the home node (200) and the requester node (202) shown in FIG. 2. Further, the storage system (304), processors (306), communication interface (308), software instructions (310) in FIG. 3 may be the same or similar to the storage system (204), processors (206), communication interface (208), and software instructions (214), respectively, in FIG. 2.

Continuing with FIG. 3, the software instructions (310) may include functionality to process one or more records. Specifically, the software instructions (310) may include functionality to one or more of the following: create a new record for storage on a home node (300), request to read a record from the home node (300), modify an existing record, write a record back to the home node (300), delete a record, and/or perform other actions on records.

In one or more embodiments of the invention, the write buffers (312) correspond to a storage structure for storing records. For example, a write buffer may be a queue (e.g., a FIFO or other queue), a cache, network storage, ranges of random access memory, a write queue in a communication interface, or any other type of storage structure. For example, for a cache, modified records are written to home from the cache when space is needed (e.g., when the cache is full but new records are being read). In one or more embodiments of the invention, the records in the write buffers (312) are ready to be written to one or more home nodes (e.g., home node (300)). Continuing with FIG. 3, scoreboards (314) correspond to a hardware and/or software structure for tracking which records have been written back to the home nodes. In one or more embodiments of the invention, the scoreboards (314) correspond to memory for storing a sequence of bits.

Figure 4:
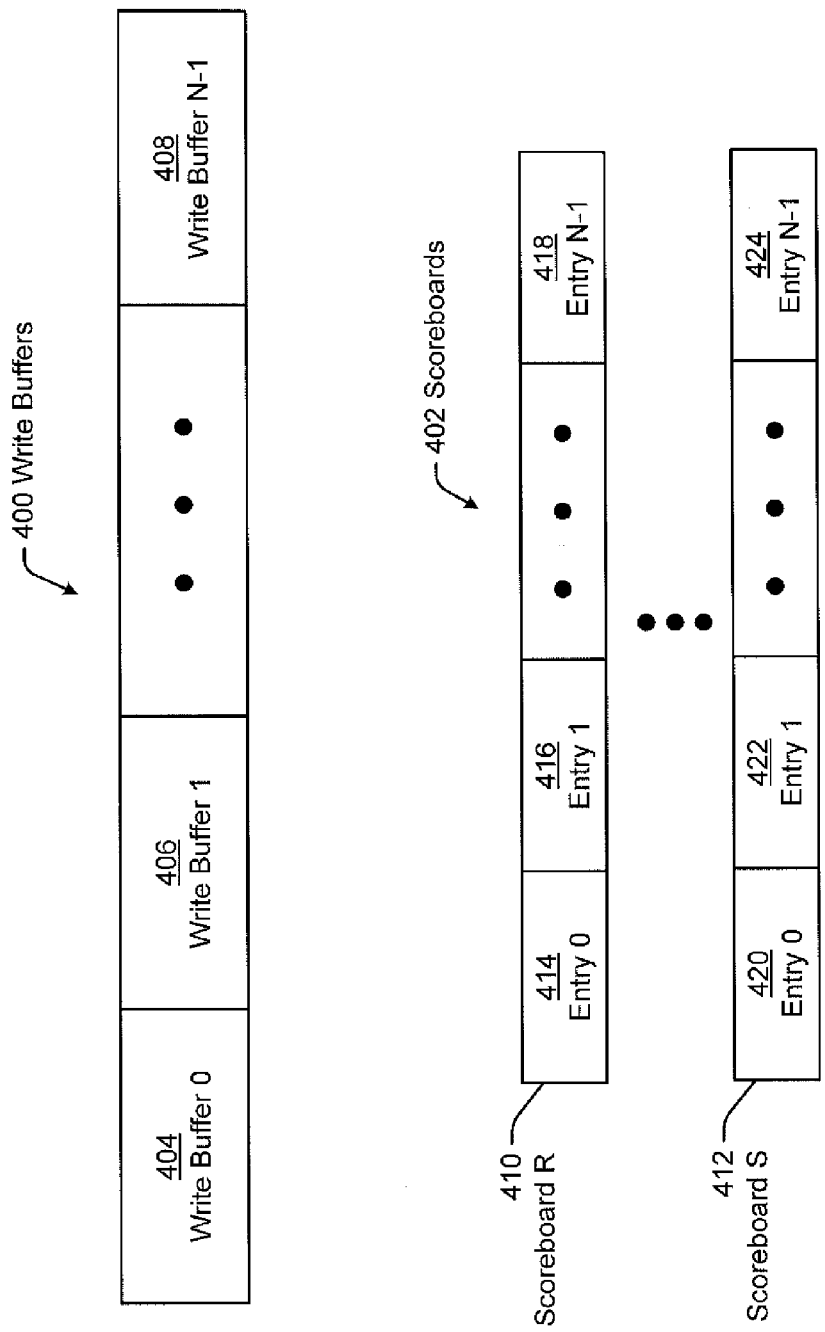

FIG. 4 shows a schematic diagram of write buffers (400) and scoreboards (402) in accordance with one or more embodiments of the invention. Each write buffer (e.g., write buffer 0 (404), write buffer 1 (406), write buffer n−1 (408)) includes functionality to store a record. Write buffers may be the same size or different sizes. Specifically, all write buffers (e.g., write buffer 0 (404), write buffer 1 (406), write buffer n−1 (408)) may be a uniform size. Alternatively, all write buffers (400) or a subset thereof may be different sizes.

In one or more embodiments of the invention, write buffers (400) are shared by multiple threads. A thread is a series of instructions in execution in accordance with one or more embodiments of the invention. Specifically, the requester node may have multiple threads executing on the requester node that process records, whereby all or a subset of the multiple threads may share the write buffers (400) to store records for transmission to one or more home nodes. In other words, at any moment in time, a particular thread may use any one or more write buffers. For example, thread X may have records stored in write buffer 0 (404) and write buffer n−1 (408) while thread Y has a record stored in write buffer 1 (406) at a first time. At a second time in the example, thread X may have a record stored in write buffer 1 (406) while thread Y has a record stored in write buffer n−1 (408).

Continuing with FIG. 4, threads of the requester node that share the write buffers (400) have corresponding scoreboards (e.g., scoreboard r (410), scoreboard (412)). Specifically, each thread may have an individual, distinct scoreboard (402). Alternatively, subsets of threads may share a scoreboard (402) in accordance with one or more embodiments of the invention. In the scenario in which subsets of threads share a scoreboard (402), the subsets of different threads are non-overlapping. For example, threads 0 to 5 may share scoreboard r (410) while threads 6-9 share scoreboard s (412).

Threads that process records may include functionality to update the corresponding scoreboard (402). Alternatively or additionally, a separate monitoring thread may update the scoreboard (402). If a subset of threads shares a scoreboard (402), then the monitoring thread may be a member of the subset.

Each scoreboard includes multiple entries (e.g., entry 0 (414), entry 1 (416), entry n−1 (418), entry 0 (420), entry 1 (422), entry n−1 (424)) for the write buffers (400) in accordance with one or more embodiments of the invention. Specifically, each write buffer (e.g., write buffer 0 (404), write buffer 1 (406), write buffer n−1 (408)) has a corresponding entry (e.g., entry 0 (414), entry 1 (416), entry n−1 (418), entry 0 (420), entry 1 (422), entry n−1 (424)) in each scoreboard (e.g., scoreboard r (410), scoreboard s (412)).

An entry stores the status of the corresponding write buffer (400). In one or more embodiments of the invention, the status indicates whether a record is in the corresponding write buffer (400) and ready to be written to the home node or whether the record has been written to the home node. In one or more embodiments of the invention, the status is only set to indicate that a record is ready to be written at the start of the checkpoint operations. In other words, writes from the write buffer to the home node clear the status in the scoreboard, but subsequent reuse of the write buffer does not change the status. The status is set when the write buffer stored a record, for a thread corresponding to the scoreboard, at the start of a checkpoint operation. In one or more embodiments of the invention, the entry may be a single bit.

For example, consider the scenario in which scoreboard R (410) is assigned to thread X and scoreboard S (412) is assigned to thread Y. At the start of the checkpoint operation for scoreboard R (410), thread X has records stored in write buffer 0 (404) corresponding to entry 0 (414) and write buffer n−1 (408) corresponding to entry n−1 (418) while thread Y has a record stored in write buffer 1 (406). Thus, entry 0 (414) and entry n−1 (418) in scoreboard R (410) have a status indicating a record is stored in the corresponding write buffers (write buffer 0 (404), write buffer n−1 (408)) and are ready to be written to the home node. After the start of the checkpoint operation, the record in write buffer 0 (404) is written to the corresponding home node and write buffer 0 (404) may be reused by thread X or any other thread. Thus, after write buffer 0 is written to the home node, only entry n−1 (418) in scoreboard R (410) has a status indicating a record is stored in the corresponding write buffer (408) and is ready to be written to the home node in accordance with one or more embodiments of the invention.

Although not shown in FIG. 4, each scoreboard (402) may include a summary bit. The summary bit captures whether any bit in the scoreboard (402) is set in accordance with one or more embodiments of the invention. For example, the summary bit value may be the result of an OR operation of the entries of the scoreboard.

While FIGS. 1-4 show a configuration of components, other configurations may be used without departing from the scope of the invention. For example, various components may be combined to create a single component. As another example, the functionality performed by a single component may be performed by two or more components. Moreover, one or more embodiments of the invention may include the components of the requester node (302) shown in FIG. 3 and all, part, or none of the components of the home node (200) shown in FIG. 2. Further, one or more embodiments of the invention may include the components of the home node (200) shown in FIG. 2 and all, part, or none of the components of the requester node (302) shown in FIG. 3. Although FIG. 4 shows the write buffers (400) as being contiguously located, one, more, or all write buffers may be in separated from other write buffers. Further, write buffers may or may not be in the same order as entries in the scoreboard in accordance with one or more embodiments of the invention. Additionally, the entries in the scoreboard may or may not be in the same order as entries in other scoreboards in accordance with one or more embodiments of the invention.

Further, although not shown in FIGS. 1-4, software instructions in the form of computer readable program code to perform embodiments of the invention may be stored, in whole or in part, temporarily or permanently, on a non-transitory computer readable medium such as a CD, DVD, storage device, diskette, tape, flash memory, physical memory, or any other computer readable storage medium. Specifically, the software instructions may correspond to computer readable program code that when executed by a processor(s), is configured to perform embodiments of the invention.

FIGS. 5-8 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that the condition exists in accordance with one or more embodiments of the invention. As another example, determination steps may be performed by performing a test, such as checking a data value to test whether the value is consistent with the tested condition in accordance with one or more embodiments of the invention.

Figure 5:
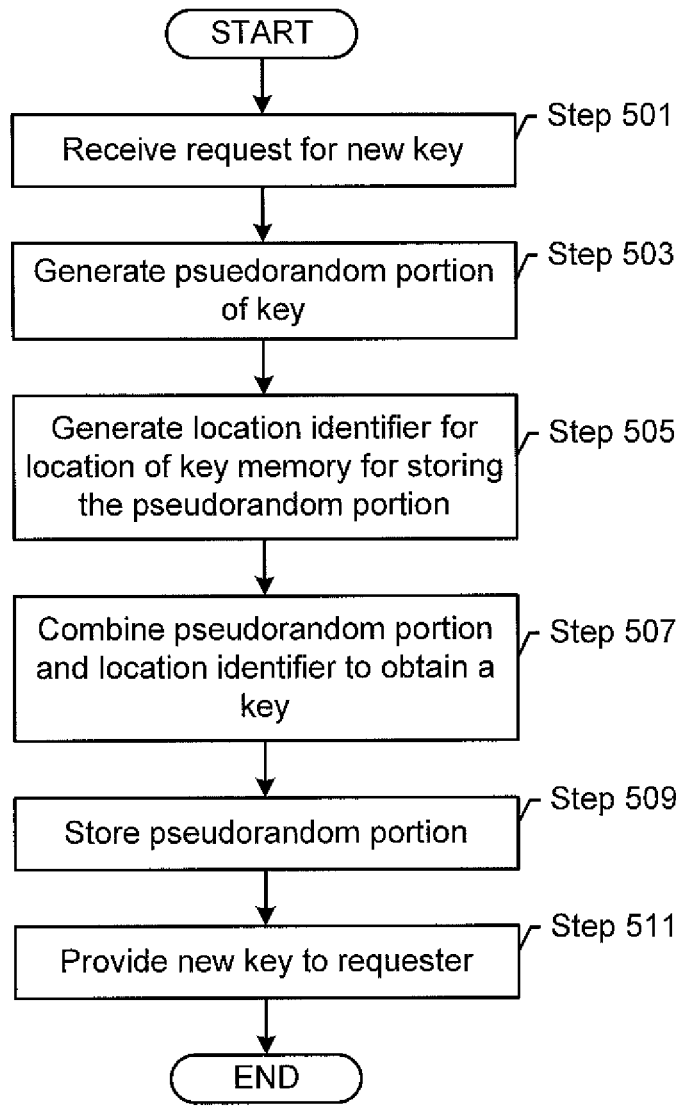
FIGS. 5-8 show flowcharts in accordance with one or more embodiments of the invention.

FIG. 5 shows a flowchart for generating a new key in accordance with one or more embodiments of the invention. In Step 501, a request for a new key is received in accordance with one or more embodiments of the invention. In one or more embodiments, an application on the requester node may request the new key. The new key may be specific to the application, a subset of applications, the requester node, or a combination thereof. In one or more embodiments, the request is received by the communication interface and transmitted to the executing resource manager.

In Step 503, a pseudorandom portion of a key is generated in accordance with one or more embodiments of the invention. Various techniques may be used to generate the pseudorandom portion of the key. For example, a random number generator generates the pseudorandom portion.

In Step 505, a location identifier is generated for the location of a key memory for storing the pseudorandom portion in accordance with one or more embodiments of the invention. In one or more embodiments of the invention, only the pseudorandom portion of the key is stored in the location. In alternative embodiments, the location identifier and/or auxiliary data are also stored in the location in key memory. In one or more embodiment, an available location is identified from key memory. Based on the available location, the location identifier matching the available location is obtained.

In Step 507, the pseudorandom portion and the location identifier are combined to obtain a key in accordance with one or more embodiments of the invention. In one or more embodiments of the invention, the pseudorandom portion and the location identifier are concatenated. The concatenation may be in a predefined order.

In Step 511, the pseudorandom portion is stored in accordance with one or more embodiments of the invention. Specifically, the pseudorandom portion is stored in key memory. As discussed above, the auxiliary data and/or the location identifier may also be stored with the pseudorandom portion in key memory.

In one or more embodiments of the invention, the above steps may be performed as a single transaction. For example, the resource manager may access a piece of hardware to request a new key. In the example, the hardware generates a new pseudorandom portion, stores the pseudorandom portion in a free location, and returns the location identifier to the resource manager, all in a single transaction.

In Step 513, a new key is provided to the requester in accordance with one or more embodiments of the invention. In one or more embodiments of the invention, the resource manager transmits the new key via the communication interface to the requester node. Once the resource manager transmits the new key, authentication using the new key may be performed by the authentication module. Thus, the processor on the home node may avoid interruption until an authentication fails in accordance with one or more embodiments of the invention.

Although not shown in FIG. 5, any auxiliary data may be stored with the pseudorandom portion. Obtaining the auxiliary data may be dependent on the type of auxiliary data. For example, if the auxiliary data defines the access rights of the requesting node, then the resource manager may identify which access rights the requesting node should have, and identify the auxiliary data for those access rights. By way of another example, if the auxiliary data defines which resources the requesting node has permission to access, then the resource manager may identify and obtain a unique identifier for the resources that the requesting node has rights to access.

Further, although not shown in FIG. 5, a request for a key may be predicated on authentication and authorization steps. For example, the requesting node may need to provide a username and password or other credentials which would be validated by the home node through a query to a database. Once authenticated, however, the key would be stored at the home node with the authorization, or access rights, of the requester node and allows the gatekeeper to quickly validate the access rights of the requester and avoid slower authorization and authentication steps.

Figure 6:
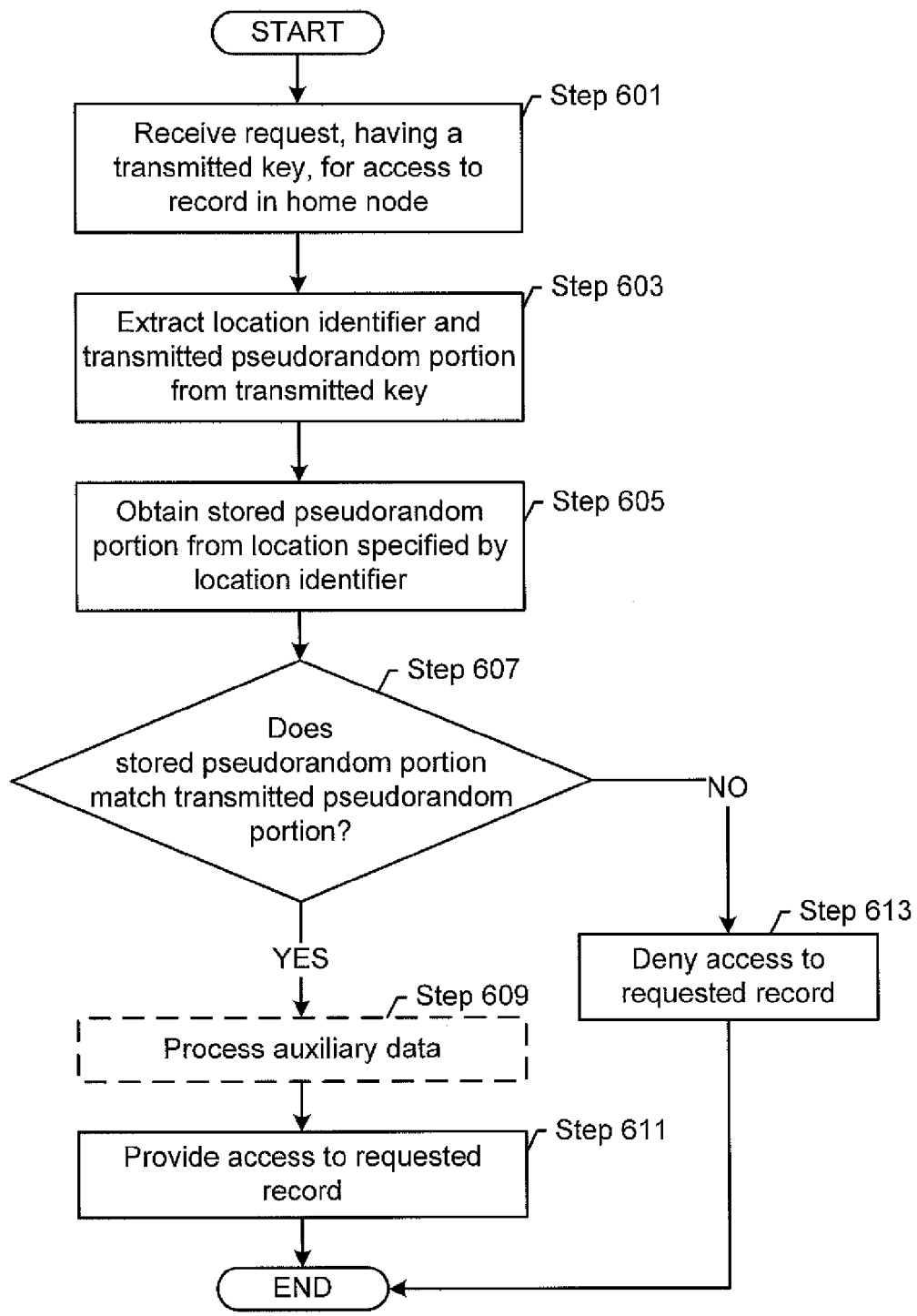

FIG. 6 shows a flowchart for processing a request in accordance with one or more embodiments of the invention. Specifically, FIG. 6 shows a schematic diagram for the authentication module to process a request.

In Step 601, a request, having a transmitted key, for access to a record in the home node is received in accordance with one or more embodiments of the invention. In one or more embodiments of the invention, the request is received by the communication interface. The communication interface directly transmits the request to the authentication module. Thus, one or more embodiments may avoid interrupting the processor or using processor cycles on the home node.

In Step 603, a location identifier and transmitted pseudorandom portion are extracted from the transmitted key in accordance with one or more embodiments of the invention. In one or more embodiments of the invention, extracting the location identifier and the transmitted pseudorandom portion may be performed according to the predefined order. Various techniques may be used to extract the portions of the key without departing from the scope of the invention.

In Step 605, the stored pseudorandom portion is obtained from the location specified by the location identifier in accordance with one or more embodiments of the invention. Specifically, the transmitted location identifier identifies a particular location in key memory. From the identified location, a stored pseudorandom portion is obtained. In one or more embodiments, by using the location identifier, one or more embodiments are not required to search the entire memory for the particular key. In other words, the time to determine whether the pseudorandom portion may be constant time and independent of the number of stored pseudorandom portions. Thus, one or more embodiments may use minimal time to authenticate a user while at the same time avoiding expensive content addressable memory structures.

In Step 607, a determination is made whether the stored pseudorandom portion matches the transmitted pseudorandom portion in accordance with one or more embodiments of the invention. In Step 609, if the stored pseudorandom portion matches the transmitted pseudorandom portion, any auxiliary data is processed in accordance with one or more embodiments of the invention. For example, processing the auxiliary data may include confirming that the requester node may access the record matching the record identifier in the request.

In Step 611, access to the requested record is provided in accordance with one or more embodiments of the invention. Specifically, access may include transmitting the requested record to the requester node. Alternatively or additionally, access may include writing a modified record or a new record to the home node. In one or more embodiments of the invention, the direct memory access is performed. Thus, by performing the authentication by the authentication module and performing DMA, the processor on the home node is bypassed in accordance with one or more embodiments of the invention.

Returning to Step 607, if the stored pseudorandom portion does not match the transmitted pseudorandom portion, access to the requested record is denied in Step 613 in accordance with one or more embodiments of the invention. In one or more embodiments of the invention, an error message may be transmitted to the requester node. Further, the resource manager executing on the processor may be notified. The notification may be after the first failure, or after a predefined number of authentication failures.

Although not shown in FIGS. 5 and 6, the home node may revoke a key in accordance with one or more embodiments of the invention. Specifically, a key may be revoke by deleting the key from key memory. Thus, after the key is deleted, the key is no longer available at the location in key memory and access will be denied. Deleting the key may be performed, for example, when the requester access rights are changed and to require the requester to obtain a new key.

Figure 7:
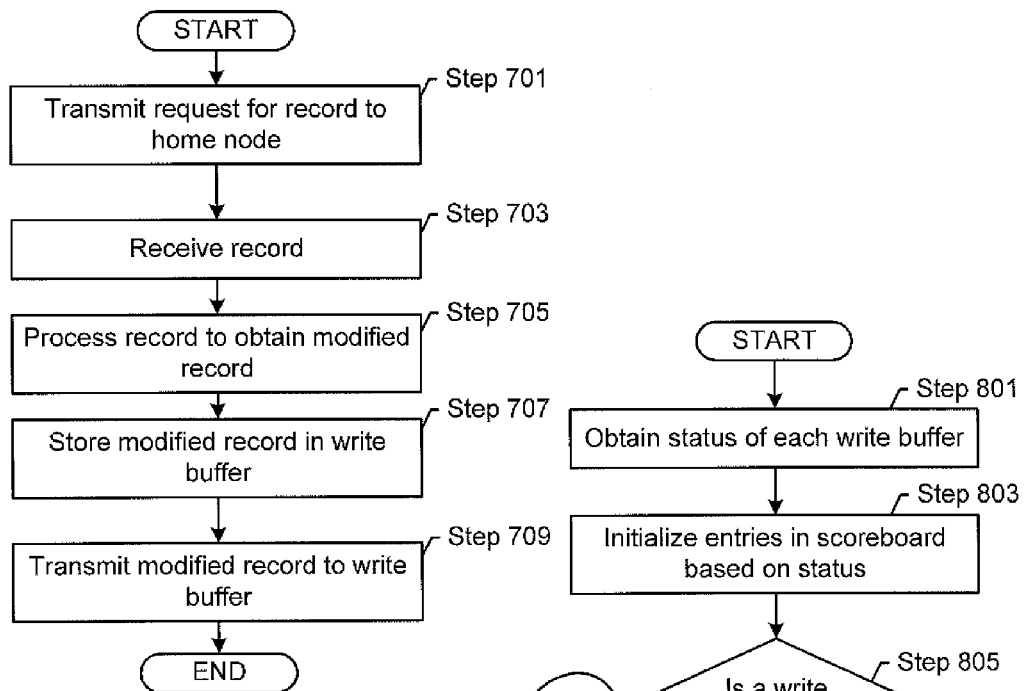

FIG. 7 shows a flowchart for processing a record by a requester node in accordance with one or more embodiments of the invention. In Step 701, a request for a record is transmitted to the home node in accordance with one or more embodiments of the invention. As discussed above, the requester node may provide a key and the record identifier.

In Step 703, the record is received in accordance with one or more embodiments of the invention. Specifically, if the key is correct, then the requester node receives the record from the home node in accordance with one or more embodiments of the invention. Steps 701 and 703 may be omitted, for example, if the requester node is creating a new record for storage on the home node.

In Step 705, the record is processed to obtain a modified record in accordance with one or more embodiments of the invention. Processing the record may be dependent on the type of application and record. In one or more embodiments of the invention, processing a record modifies a record. Modifying a record may include creating a new record. After the record is processed, the modified record is stored in the write buffer in Step 707 in accordance with one or more embodiments of the invention. In one or more embodiments of the invention, the storing of the record in the write buffer indicates that the record is ready for transmission to the home node.

In Step 709, the modified record is transmitted to a write buffer in accordance with one or more embodiments of the invention. Transmitting the modified record may be performed similar to Step 701. Specifically, a request may be transmitted to the home node with the modified record, the key, and a record identifier in accordance with one or more embodiments of the invention.

Figure 8:
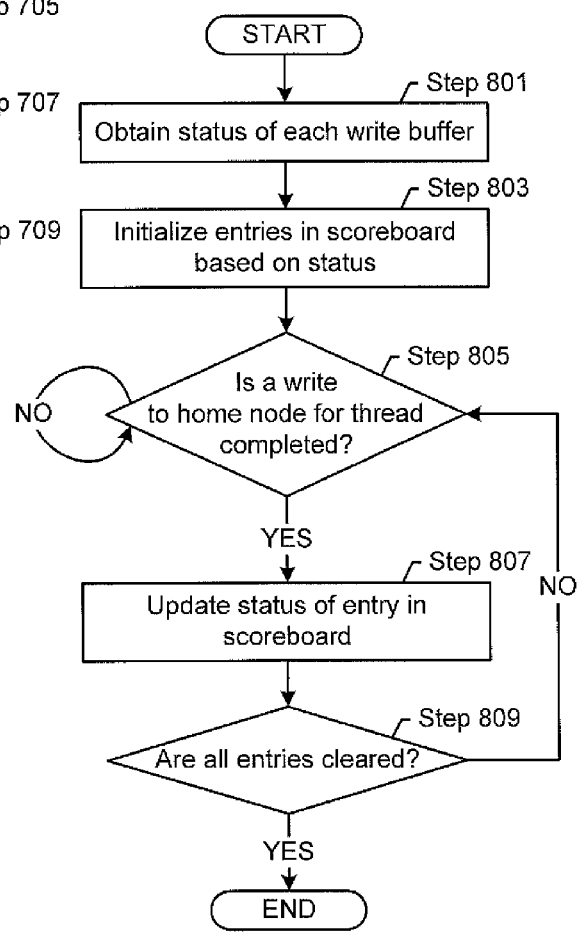

FIG. 8 shows a flowchart for performing a checkpoint operation in accordance with one or more embodiments of the invention. The checkpoint operation shown in FIG. 8 is for performing a checkpoint for a single thread or set of threads belonging to the same single scoreboard. FIG. 8 may be repeated synchronously or asynchronously for other scoreboards. In one or more embodiments of the invention, the checkpoint indicates that all records, which were in the write buffers at the start of the checkpoint operation and for a particular thread or set of threads, are written to the home node as of the conclusion of the checkpoint operation. The checkpoint operation may be performed by the thread or set of threads, which corresponds to the scoreboard.

In Step 801, the status of each write buffer is obtained in accordance with one or more embodiments of the invention. Obtaining the status include determining, for each write buffer, whether the write buffer is currently storing a record for writing to a home node. In one or more embodiments of the invention, the status may be for only the write buffers that store a record for a thread assigned to the scoreboard. Alternatively, the status may be obtained for all write buffers.

In Step 803, entries in the scoreboard are initialized based on the status in accordance with one or more embodiments of the invention. Specifically, entries that correspond to write buffers, which have records for writing to the home node, are set. The remaining entries are cleared in accordance with one or more embodiments of the invention. In the present application, the use of the term "set" means to set the value to indicate that a record is waiting to be written to the home node. The use of the term "cleared" indicates that the value is not the same as the "set" value and indicates either a "don't care" or that a record is not waiting. For example, "set" may be to set the value to "1" and "cleared" may be to set the value to "0". Alternatively, by way of another example, set may be to set the value to "0" and cleared may be to set the value to "1".

In Step 805, a determination is made whether a write for a thread to a home node is completed in accordance with one or more embodiments of the invention. If a write is performed, the status of an entry in the scoreboard is updated in Step 807 in accordance with one or more embodiments of the invention. In one or more embodiments of the invention, the entry corresponding to the write buffer is cleared. After the entry is cleared, future writes by any thread of a record to the write buffer during the checkpoint operation do not modify the scoreboard. If a write for a thread to a home node is not completed, Step 805 may be repeated.

In Step 809, a determination is made whether all the entries are cleared in accordance with one or more embodiments of the invention. Specifically, a determination is made whether all entries are cleared. Determining whether all bits are set may be performed by checking the summary bit in accordance with one or more embodiments of the invention. If the summary bit is set, then at least one entry in the scoreboard is also set in accordance with one or more embodiments of the invention. If all entries are not yet cleared, then the flow may proceed to Step 805. If all entries are cleared, then the checkpoint operation is complete.

FIGS. 9-12 show an example in accordance with one or more embodiments of the invention. The following example is for explanatory purposes only and not intended to limit the scope of the invention. FIG. 9 shows a request (900) in accordance with one or more embodiments of the invention. As shown in FIG. 9, the request (900) in the example includes a read operation code (902) to indicate that the requesting node would like to read a record, a record identifier (904) of the record, and a key (906) for authentication.

Turning to FIG. 10, from the request, the authentication module extracts key (906). Based on a predefined order, as shown in FIG. 11, the authentication module extracts a pseudorandom portion (1100) (i.e., 32156132486 in the example) and location identifier (1102) (i.e., 1023 in the example) from the key.

As shown in FIG. 12, the authentication module uses the location identifier to access key memory (1200). Specifically, because the location identifier is in the key, the authentication module is able to directly and immediately access the location (1202) and obtain a stored pseudorandom portion (1204) from the location (1202). By comparing the stored pseudorandom portion with the transmitted pseudorandom portion in the key (906 in FIG. 9), the authentication module confirms that the requesting node may read the record. Accordingly, in the example, the authentication module allows the requesting node to perform direct memory access to obtain the record from the storage system on the home node.

FIGS. 13-18 show an example of performing a checkpoint operation in accordance with one or more embodiments of the invention. The following example is for explanatory purposes only and not intended to limit the scope of the invention. FIGS. 13-18 show charts of the checkpoint operations. In the charts, each row corresponds to a particular scoreboard (e.g., scoreboard0, scoreboard1, scoreboard2, scoreboard3) and each column corresponds to a write buffer (WB). Further, an "x" indicates that the value may be any value.

FIG. 13 shows the scoreboards at time t0 (1302) when scoreboard0 (1304) is initialized to start a checkpoint operation. As shown in FIG. 13, the threads assigned to scoreboard0 (1304) have records in WB0 (1306), WB2 (1308), and WB4 (1310) as denoted by the "1" in FIG. 13. Accordingly, the summary bit (1312) is set.

In the example, at time t1, the record in WB2 is written to the home node.

FIG. 14 shows the scoreboards at time t1 (1402). As shown in FIG. 14, the entry at WB2 (1404) and scoreboard0 (1406) is cleared to a value of "0", thereby indicating that the record is written to the home node. After the record in WB2 is written to the home node, the WB2 may be reused by any thread in accordance with one or more embodiments of the invention.

At time t2, the remaining scoreboards may be initialized in the example. FIG. 15 shows the scoreboards at time t2 (1502). As shown in FIG. 15, WB7 (1512) is storing a record after the start of the checkpoint operation for scoreboard0 (1504). Accordingly, scoreboard0 (1504) has the entry for WB7 (1512) as cleared while scoreboard1 (1506), scoreboard2 (1508), and scoreboard3 (1510) each have the entry for WB7 (1512) as set. Further, all scoreboards may have the entries for WB4 (1514) and WB0 (1516) as set. Additionally, because WB2 (1518) is reused by the threads assigned to scoreboard3 (1510), the entry for WB2 (1518) and scoreboard3 (1510) is set.

Continuing with the example, at time t3, the record stored in WB0 is written to the home node. FIG. 16 shows the scoreboards at time t3 (1602). As shown in FIG. 16, the write to the home node causes the entry at WB0 (1604) for all scoreboards to be cleared.

At time t4, the record stored in WB6 is written to the home node. FIG. 17 shows the scoreboards at time t4 (1702). As shown in FIG. 17, the write to the home node causes the entry at WB6 (1704) for the scoreboards that had the entry set (i.e., scoreboard2 (1706), scoreboard3 (1708)) to be cleared.

At time t5, the record stored in WB4 is written to the home node. FIG. 18 shows the scoreboards at time t5 (1802). As shown in FIG. 18, the write to the home node causes the entry at WB4 (1804) for all scoreboards to be cleared. Further, because all entries in scoreboard0 (1806) are cleared, the summary bit (1808) for scoreboard0 (1806) is also cleared, thereby completing the checkpoint operation for scoreboard0. Thus, in the example, a checkpoint is complete, indicating that all records from threads associated with scoreboard0 that were in the write buffers at the start of the checkpoint operation are written to the respective home nodes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for record access in a distributed system, comprising:

receiving, at a hardware gatekeeper from a requester node, a request for a record of a resource of a home node, wherein the request comprises a transmitted key and a record identifier;

extracting a location identifier and a transmitted pseudorandom portion from the transmitted key, wherein the location identifier specifies a location, in a key memory operatively connected to an authentication module, of a stored pseudorandom portion, and wherein the authentication module comprises the hardware gatekeeper;

obtaining the stored pseudorandom portion from the location in the key memory specified by the location identifier; and providing the requester node access to the record identified by the record identifier when the transmitted pseudorandom portion matches the stored pseudorandom portion, wherein the transmitted pseudorandom portion and the stored pseudorandom portion are matched by the hardware gatekeeper;

processing, by the requester node, the record to obtain a first modified record;

storing the first modified record in a write buffer of a plurality of write buffers of the requester node;

obtaining a first storage status of each of the plurality of write buffers;

initializing, in a first scoreboard, a first plurality of entries corresponding to the plurality of write buffers based on the first storage status; and for each write of the first modified record from the write buffer of the plurality of write buffers to the home node, clearing a first entry of the first plurality of entries based on the first entry corresponding to the write buffer, wherein a first checkpoint is complete when each entry of the first plurality of entries in the first scoreboard is cleared.

2. The method of claim 1, further comprising:
obtaining auxiliary data from the key memory; and
processing the auxiliary data.

3. The method of claim 2, wherein the auxiliary data comprises:
a description of the resource accessible based on the transmitted key, wherein the resource comprises the record.

4. The method of claim 1, wherein the first scoreboard corresponds to a first thread and wherein the method further comprises:
after initializing the first plurality of entries and after a subset of the first plurality of entries is cleared:
reusing, for a second thread, at least one of the plurality of write buffers for storing a second modified record without modifying the first plurality of entries based on the storing of the second modified record;
obtaining a second storage status of each of the plurality of write buffers;
initializing, in a second scoreboard, a second plurality of entries corresponding to the plurality of write buffers based on the second storage status, wherein the second scoreboard corresponds to the second thread;
for each write of the second modified record from the write buffer of the plurality of write buffers to the home node, clearing a second entry of the second plurality of entries,
wherein a second checkpoint is complete when each entry of the second plurality of entries is cleared.

5. The method of claim 4, wherein the first scoreboard corresponds to a first plurality of threads comprising the first thread, and wherein the second scoreboard corresponds to a second plurality of threads comprising the second thread.

6. A system for record access in a distributed system, comprising:
an authentication module comprising:
key memory configured to store a plurality of pseudorandom portions of a plurality of keys; and
a hardware gatekeeper configured to:

receive a request for a record, wherein the request comprises a transmitted key and a record identifier;

extract a first location identifier and a transmitted pseudorandom portion from the transmitted key, wherein the first location identifier specifies a first location, in the key memory of a stored pseudorandom portion of the plurality of pseudorandom portions;

obtain the stored pseudorandom portion from the first location in the key memory specified by the first location identifier; and provide access to the record identified by the record identifier by determining that the transmitted pseudorandom portion matches the stored pseudorandom portion;

a storage system for storing a plurality of write buffers;
a first scoreboard comprising a first plurality of entries, wherein each entry of the first plurality of entries corresponds to a write buffer of the plurality of write buffers; and
a first thread configured to:
obtain a first storage status of each of the plurality of write buffers;
initialize, in the first scoreboard, the first plurality of entries based on the first storage status;
for each write of a first modified record from a corresponding write buffer of the plurality of write buffers to a home node, clear a first entry of the first plurality of entries based on the first entry corresponding to the corresponding write buffer; and
save a first checkpoint when each entry of the first plurality of entries in the first scoreboard is cleared.

7. The system of claim 6, wherein the key memory is further configured to store:
auxiliary data for storing a description of the resource accessible based on the transmitted key, wherein the resource comprises the record.

8. The system of claim 6, further comprising:
a resource manager configured to:
receive a new key request to generate a new key;
generate a new pseudorandom portion of the new key;
generate a second location identifier based on a free location in the key memory for storing the new pseudorandom portion;
combine the second location identifier with the new pseudorandom portion to obtain the new key;
store the new pseudorandom portion in a second location specified by the second location identifier; and
provide the new key to a requester.

9. The system of claim 6, further comprising:
a storage system for storing a plurality of software instructions of the resource manager.

10. The system of claim 6, further comprising:
a central processing unit; and
a storage system for storing a plurality of records,
wherein providing access to the record identified by the record identifier comprises obtaining the record directly from the storage system while bypassing the central processing unit.

11. The system of claim 6, further comprising:
a second scoreboard comprising a second plurality of entries, wherein each entry of the second plurality of entries corresponds to a write buffer of the plurality of write buffers; and
a second thread configured to:

after the initializing of the first plurality of entries and after a subset of the first plurality of entries is cleared:
  reuse at least one of the plurality of write buffers for storing a second modified record without modifying the first plurality of entries based on the storing of the second modified record;
  obtain a second storage status of each of the plurality of write buffers;
  initialize, in the second scoreboard, the second plurality of entries based on the second storage status;
  for each write of a second modified record from the corresponding write buffer of the plurality of write buffers to the home node, clearing a second entry of the second plurality of entries based on the second entry corresponding to the corresponding write buffer; and
  saving a second checkpoint when each entry of the second plurality of entries is cleared.

12. A distributed system for record access, comprising:
a requester node configured to transmit a request for a record, wherein the request comprises a transmitted key and a record identifier, the requester node comprising:
  a storage system for storing a plurality of write buffers;
  a first scoreboard comprising a first plurality of entries, wherein each entry of the first plurality of entries corresponds to a write buffer of the plurality of write buffers; and
  a first thread configured to:
    obtain a first storage status of each of the plurality of write buffers;
    initialize, in the first scoreboard, the first plurality of entries based on the first storage status;
    for each write of a first modified record from a corresponding write buffer of the plurality of write buffers to the home node, clear a first entry of the first plurality of entries based on the first entry corresponding to the corresponding write buffer; and
    save a first checkpoint when each entry of the first plurality of entries in the first scoreboard is cleared; and
a home node comprising:
  an authentication module comprising:
    key memory configured to store a plurality of stored pseudorandom portions of a plurality of keys;
    a hardware gatekeeper configured to:
      receive the request for the record from the requester node;
      extract a first location identifier and a transmitted pseudorandom portion from the transmitted key, wherein the location identifier specifies a first location, in the key memory, of a stored pseudorandom portion of the plurality of stored pseudorandom portions;
      obtain the stored pseudorandom portion from the first location in the key memory specified by the first location identifier; and
      provide access to the record identified by the record identifier by determining that the transmitted pseudorandom portion matches the stored pseudorandom portion.

13. The distributed system of claim 12, wherein the home node further comprises:
  a resource manager configured to:
    receive a new key request for generating a new key;
    generate a new pseudorandom portion of the new key;
    generate a second location identifier based on a free location in the key memory for storing the new pseudorandom portion;
    combine the second location identifier with the new pseudorandom portion to obtain the new key;
    store the new pseudorandom portion in a second location specified by the second location identifier; and
    provide the new key to a requester.

14. The distributed system of claim 12, wherein the home node further comprises:
  a storage system for storing a plurality of software instructions of the resource manager.

15. The distributed system of claim 12, wherein the home node further comprises:
  a central processing unit; and
  a storage system for storing a plurality of records,
  wherein providing access to a record identified by the record identifier comprises obtaining the record directly from the storage system while bypassing the central processing unit.

16. The distributed system of claim 12, wherein the requester node further comprises:
  a second scoreboard comprising a second plurality of entries, wherein each entry of the second plurality of entries corresponds to a write buffer of the plurality of write buffers; and
  a second thread configured to:
    after the initializing of the first plurality of entries and after a subset of the first plurality of entries is cleared:
      reuse at least one of the plurality of write buffers for storing a second modified record without modifying the first plurality of entries based on the storing of the second modified record;
      obtain a second storage status of each of the plurality of write buffers;
      initialize, in the second scoreboard, the second plurality of entries based on the second storage status;
      for each write of a second modified record from the corresponding write buffer of the plurality of write buffers to the home node, clearing a second entry of the second plurality of entries based on the second entry corresponding to the corresponding write buffer; and
      saving a second checkpoint when each entry of the second plurality of entries is cleared.

17. The distributed system of claim 16, wherein the first scoreboard corresponds to a first plurality of threads comprising the first thread, and wherein the second scoreboard corresponds to a second plurality of threads comprising the second thread.

* * * * *

UNITED STATES PATENT AND TRADEMARK OFFICE
CERTIFICATE OF CORRECTION

| | |
|---|---|
| PATENT NO. | : 9,489,336 B2 |
| APPLICATION NO. | : 13/942240 |
| DATED | : November 8, 2016 |
| INVENTOR(S) | : Fuller et al. |

Page 1 of 1

It is certified that error appears in the above-identified patent and that said Letters Patent is hereby corrected as shown below:

In the Drawings

On sheet 4 of 9, in FIG. 5, under Reference Numeral Step 503, Line 1, delete "psuedorandom" and insert -- pseudorandom --, therefor.

In the Specification

In Column 6, Line 3, before "(412))." insert -- s --.

Signed and Sealed this
Thirteenth Day of June, 2017

Joseph Matal
*Performing the Functions and Duties of the
Under Secretary of Commerce for Intellectual Property and
Director of the United States Patent and Trademark Office*